United States Patent

Eizenhöfer et al.

Patent Number: 5,220,057
Date of Patent: Jun. 15, 1993

[54] FORMAZAN DYESTUFFS

[75] Inventors: Thomas Eizenhöfer, Bonn; Karl-Josef Herd, Odenthal-Holz; Hermann Henk, Cologne; Rolf Brockmann, Bergisch-Gladbach; Frank-Michael Stöhr, Odenthal-Osenau; Karl-Heinz Schündehütte, Leverkusen, all of Fed. Rep. of Germany

[73] Assignee: Bayer Aktiengesellschaft, Leverkusen, Fed. Rep. of Germany

[21] Appl. No.: 653,834

[22] Filed: Feb. 11, 1991

[30] Foreign Application Priority Data

Feb. 17, 1990 [DE] Fed. Rep. of Germany ....... 4005122

[51] Int. Cl.$^5$ ................. C09B 50/00; C09B 62/463
[52] U.S. Cl. ........................................ 534/618; 8/549
[58] Field of Search .............................. 534/618; 8/549

[56] References Cited

U.S. PATENT DOCUMENTS

| | | | |
|---|---|---|---|
| 3,068,219 | 12/1962 | Beffa et al. | 534/618 |
| 3,725,382 | 4/1973 | Grandjean | 534/618 |
| 4,007,164 | 2/1977 | Bien et al. | 260/146 D |
| 4,024,123 | 5/1977 | Dussy et al. | 534/618 |

FOREIGN PATENT DOCUMENTS

| | | | |
|---|---|---|---|
| 321784 | 6/1989 | European Pat. Off. | 534/618 |
| 0338310 | 10/1989 | European Pat. Off. | 534/618 |
| 2364764 | 12/1973 | Fed. Rep. of Germany | 534/618 |
| 3239364 | 4/1984 | Fed. Rep. of Germany | 534/618 |
| 3718397 | 12/1988 | Fed. Rep. of Germany | 534/618 |

*Primary Examiner*—Richard L. Raymond
*Attorney, Agent, or Firm*—Sprung Horn Kramer & Woods

[57] ABSTRACT

Dyestuffs of the formula

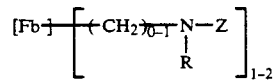

in which the substituents have the meanings given in the description are suitable for the dyeing and printing of hydroxyl- and amido-containing materials.

11 Claims, No Drawings

FORMAZAN DYESTUFFS

The present invention relates to new, heavy-metal-containing formazan dyestuffs of the general formula

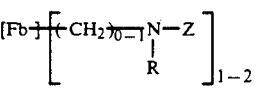 (1)

in which Fb is a radical of the formula

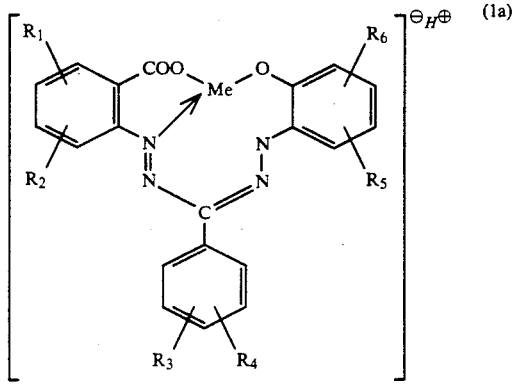 (1a)

or a radical of the formula

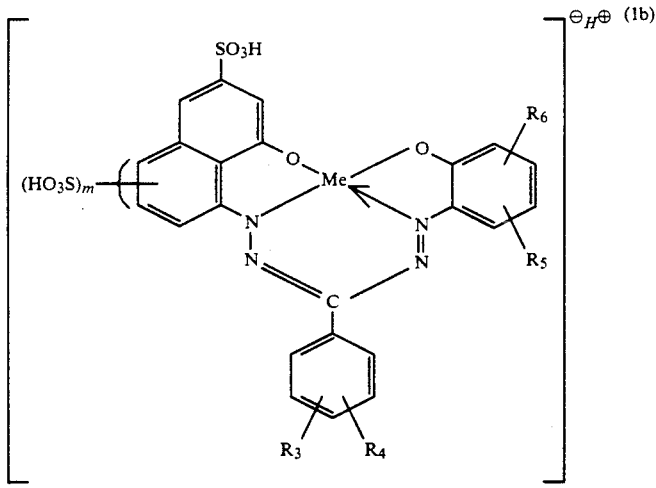 (1b)

$R_1$ to $R_6$, independently of one another, are H, $C_1$-$C_4$-alkyl, $C_1$-$C_4$-alkoxy, hydroxyl, halogen, carboxyl, sulphonamido, alkyl- or arylcarbonylamino or -sulphonylamino, or —$SO_3H$, R is hydrogen, $C_1$-$C_4$-alkyl, Z is a fibre-reactive radical of the formula

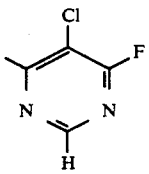 (1c)

m is 0 or 1,

Me is a divalent metal atom, for example Fe, Cu, Zn, Co, Ni, preferably Cu.

The alkyl and aryl radicals can be further substituted. Alkyl for example by OH, $OSO_3H$, COOH.

Aryl radicals are in particular substituted or unsubstituted phenyl (substituents preferably $C_1$-$C_4$-alkyl, $C_1$-$C_4$-alkoxy).

Examples of suitable alkylcarbonylamino groups are $C_1$-$C_4$-alkylcarbonylamino groups, suitable arylcarbonylamino groups are in particular substituted or unsubstituted phenylcarbonylamino groups, suitable sulphonamido groups are in particular sulphonamide, n-$C_1$-$C_4$-alkyl- and n,n-di-$C_1$-$C_4$-sulphonamide.

Preferred dyestuffs are those of the formulae

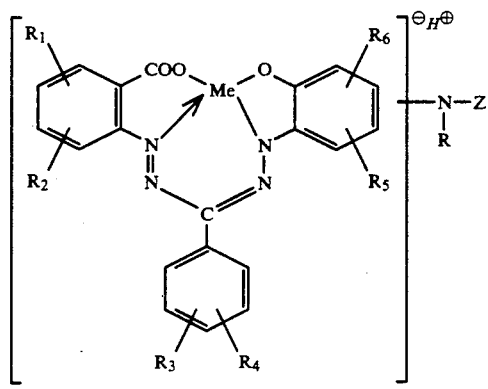 (2)

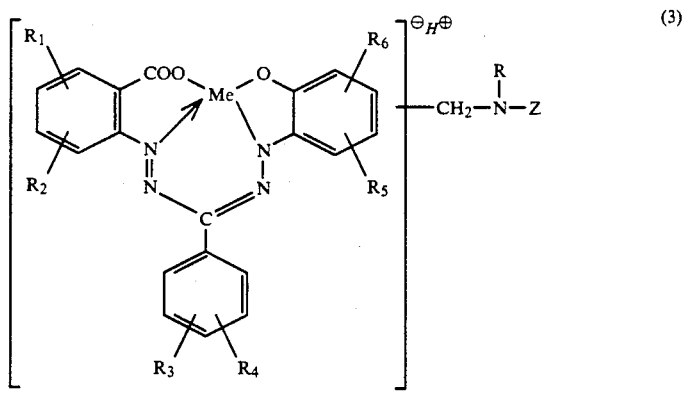
(3)
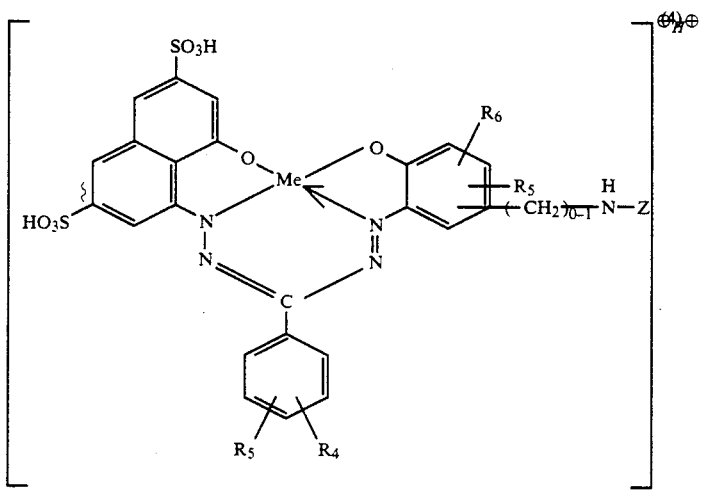
(4)
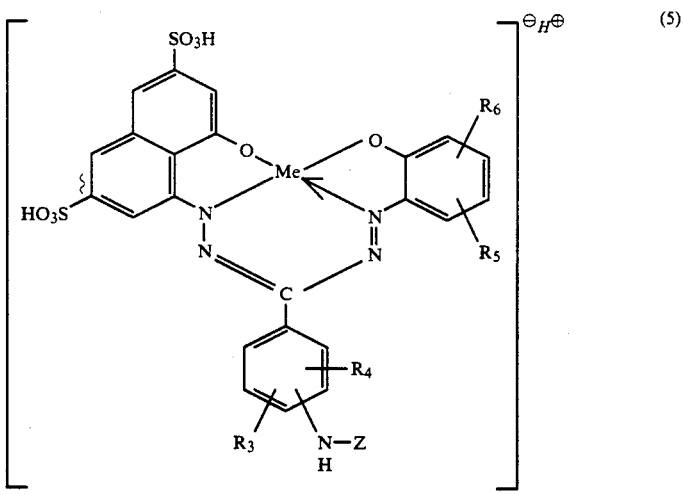
(5)
in which $R_1$–$R_6$, R, Z and Me have the abovementioned meaning.
Particular preference is given to dyestuffs of the formulae (6)–(11)

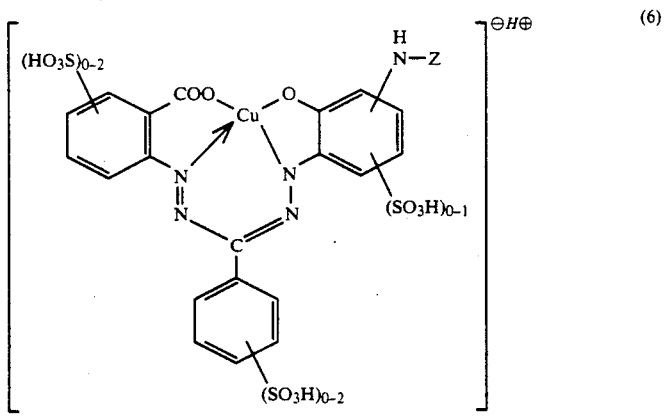
(6)
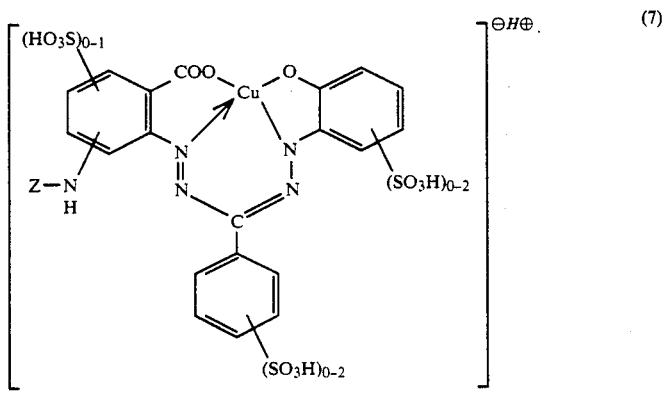
(7)
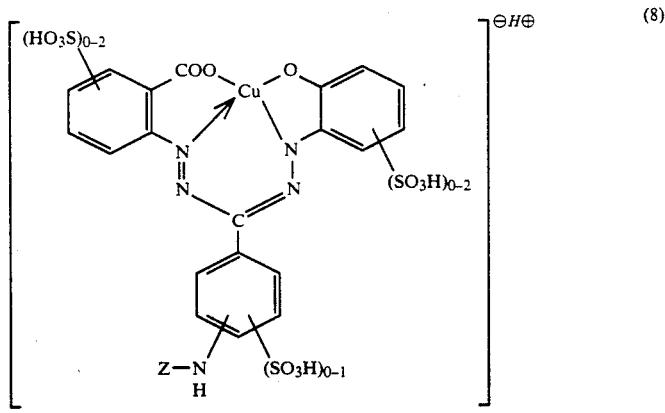
(8)
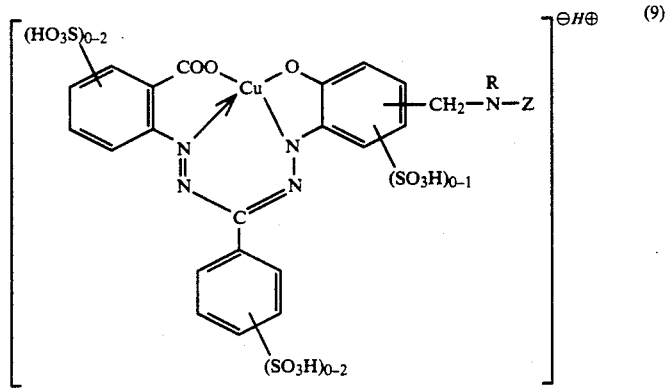
(9)

-continued
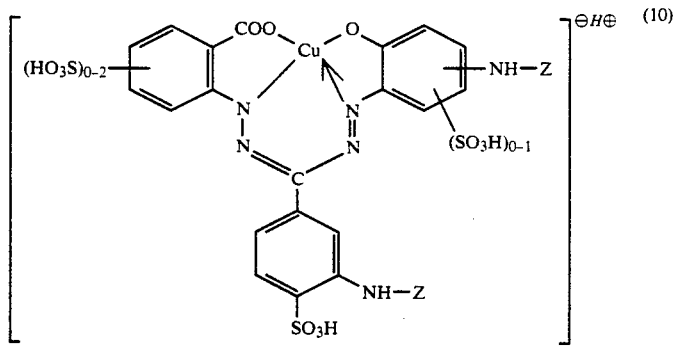 (10)
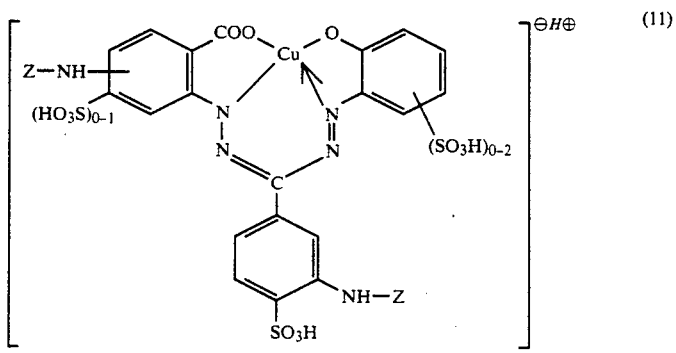 (11)
Further particularly preferred dyestuffs are dyestuffs of the formula (12)
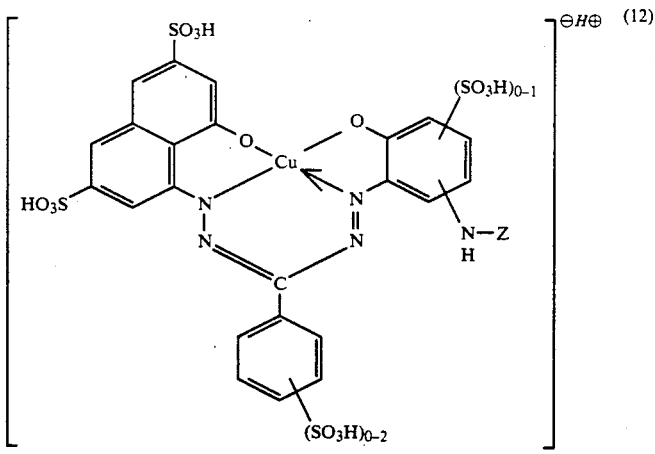 (12)
and the formula (13)

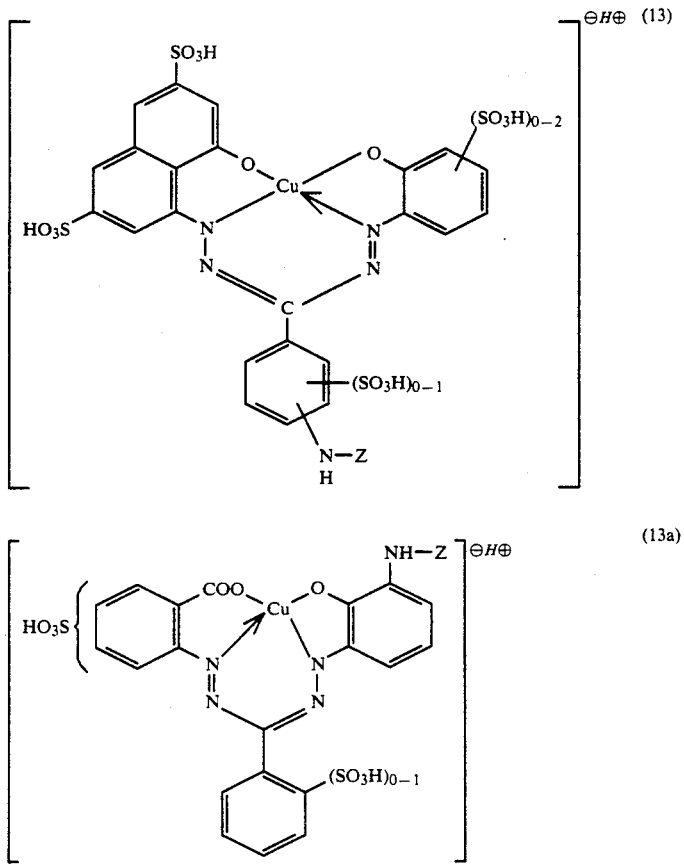

and mixtures of dyestuffs (13a), R and Z having the abovementioned meaning.

Preference is also given to mixtures of the formulae (6)–(11), and to mixtures of the formulae (12) and (13).

The dyestuffs of the formula 1 are obtained by reaction of the dyestuff bases of the general formula

with the reactive component

Z-F      (15)

with the elimination of HF, where Fb, R and Z have the abovementioned meaning, by methods known per se, preferably in aqueous solution or suspension and in the presence of alkaline, acid-binding agents, for example aqueous alkali metal (Li, Na, K) hydroxides, carbonates or bicarbonates.

The preparation of the dyestuff bases is described, for example, in DE-A 2,557,141, dyestuff bases of the formulae (6)–(8), DE-A 3,239,364 A 1, dyestuff bases of the formula (9), DE-A 3,743,361, dyestuff bases of the formulae (10) and (11), DE-A 3,812,698, dyestuff bases of the formulae (12) and (13).

The formulae given are those of the free acids. In the preparation, in general the salts are obtained, in particular the alkali metal salts such as sodium salts, potassium salts or lithium salts. The dyestuffs can also be used in the form of concentrated solutions.

The dyestuffs according to the invention are highly suitable for the dyeing and printing of natural and synthetic hydroxyl- or amido-containing materials, in particular those made of cellulose and polyamides. Mixtures of dyestuffs consisting of dyestuffs of the formula (1) have improved solubility properties.

Not only the dyestuffs but also the mixtures of dyestuffs are particularly suitable for the dyeing of cellulose materials by the exhaust, padding, cold-pad-batch and the continuous method, and by the printing method.

Dyeings are obtained which have good general fastness properties, in particular wet and light fastness properties in combination with good build-up properties and high degrees of fixation.

EXAMPLE 1

1 mol of the dyestuff base (tetrasodium salt) of the formula

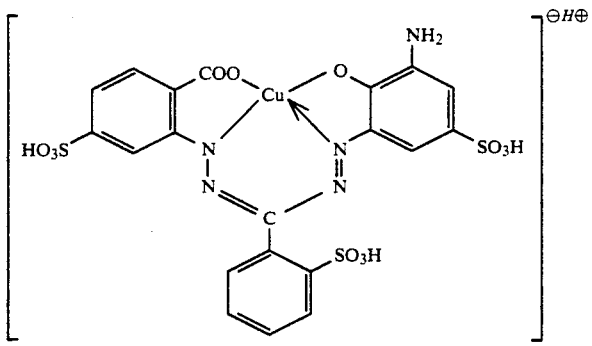

is dissolved in 2000 ml of water and condensed at a pH of 6.5 and 40°–50° C. with 1.2 mol of 5-chloro-4,6-difluoropyrimidine.

During the condensation reaction, the pH is kept constant by means of an alkali metal bicarbonate, alkali metal carbonate or alkali metal hydroxide solution.

After the condensation with the pyrimidine derivative is complete, the dyestuff is salted out, isolated and dried.

A blue dyestuff powder which, in the form of the free acid, corresponds to the following formula

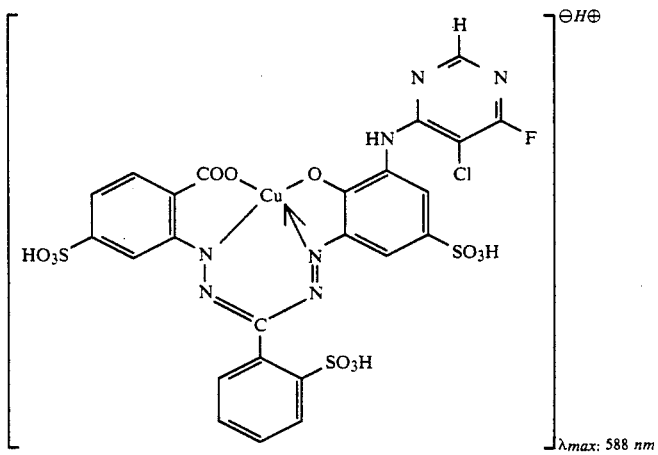

$\lambda_{max}$: 588 nm is obtained.

The dyestuff dissolves in water giving a dark blue solution and produces blue dyeings and prints on cellulose materials.

EXAMPLES 2–54

Further interesting blue dyestuffs are obtained by condensing the o-aminobenzoic acids shown in Table 1, column 1 after diazotizing and reduction to hydrazines with the aldehydes shown in Table 1, column 2, to give hydrazones, diazotizing the 2-aminophenol components from column 3, Table 1, and carrying out the coupling reaction in the presence of a metal salt from column 4, Table 1, hydrolysing the arylamino group(s) and then condensing the product with 5-chloro-4,6-difluoropyrimidine.

The reactive dyestuffs thus obtained produce, on cellulose materials, blue dyeings and prints having the physical data listed in column 5, Table 1.

TABLE 1

| Ex. | 2-aminobenzoic acid component | Aldehyde | 2-aminophenol component | Me | $\lambda_{max}$ [nm] ($H_2O$) |
|---|---|---|---|---|---|
| 2 | HO$_3$S—C$_6$H$_3$(NH$_2$)—CO$_2$H | CHO (benzaldehyde) | HO—C$_6$H$_2$(NHCOCH$_3$)(NH$_2$)(SO$_3$H) | Cu | 608 |

TABLE 1-continued

| Ex. | 2-aminobenzoic acid component | Aldehyde | 2-aminophenol component | Me | $\lambda_{max}$ [nm] ($H_2O$) |
|---|---|---|---|---|---|
| 3 | 2-amino-5-sulfobenzoic acid | benzaldehyde | 2-hydroxy-3-amino-5-sulfo-acetanilide | Cu | 612 |
| 4 | 2-amino-4-sulfobenzoic acid | benzaldehyde | 2-hydroxy-3-amino-5-acetamido-benzenesulfonic acid | Cu | 622 |
| 5 | 2-amino-5-sulfobenzoic acid | benzaldehyde | 2-hydroxy-3-amino-5-acetamido-benzenesulfonic acid | Cu | 628 |
| 6 | 2-amino-4-sulfobenzoic acid | 2-sulfobenzaldehyde | 2-hydroxy-3-amino-5-acetamido-benzenesulfonic acid | Cu | 604 |
| 7 | 2-amino-5-sulfobenzoic acid | 2-sulfobenzaldehyde | 2-hydroxy-3-amino-5-acetamido-benzenesulfonic acid | Cu | 610 |
| 8 | 2-amino-5-sulfobenzoic acid | 2-sulfobenzaldehyde | 2-hydroxy-3-amino-5-sulfo-acetanilide | Cu | 602 |
| 9 | 2-aminobenzoic acid | 2-sulfobenzaldehyde | 2-hydroxy-3-amino-5-sulfo-acetanilide | Cu | 588 |
| 10 | 2-aminobenzoic acid | 2-sulfobenzaldehyde | 2-hydroxy-3-amino-5-acetamido-benzenesulfonic acid | Cu | — |
| 11 | 2-aminobenzoic acid | benzaldehyde | 2-hydroxy-3-amino-5-acetamido-benzenesulfonic acid | Cu | — |

TABLE 1-continued

| Ex. | 2-aminobenzoic acid component | Aldehyde | 2-aminophenol component | Me | $\lambda_{max}$ [nm] ($H_2O$) |
|---|---|---|---|---|---|
| 12 | 2-aminobenzoic acid | benzaldehyde | 3-acetamido-2-hydroxy-5-sulfo-aminobenzene | Cu | |
| 13 | 2-amino-4-sulfamoylbenzoic acid | 2-formylbenzenesulfonic acid | 3-acetamido-2-hydroxy-5-sulfo-aminobenzene | Cu | |
| 14 | 2-amino-4-sulfamoylbenzoic acid | benzaldehyde | 3-acetamido-2-hydroxy-5-sulfo-aminobenzene | Cu | |
| 15 | 2-amino-4-sulfamoylbenzoic acid | benzaldehyde | 5-acetamido-3-amino-2-hydroxybenzenesulfonic acid | Cu | |
| 16 | 2-amino-4-sulfamoylbenzoic acid | 2-formylbenzenesulfonic acid | 5-acetamido-3-amino-2-hydroxybenzenesulfonic acid | Cu | |
| 17 | 4-acetamido-2-aminobenzoic acid | benzaldehyde | 3-amino-4-hydroxybenzenesulfonic acid | Cu | |
| 18 | 4-acetamido-2-aminobenzoic acid | benzaldehyde | 3-amino-4-hydroxy-1,5-benzenedisulfonic acid | Cu | 594 |
| 19 | 5-acetamido-2-aminobenzoic acid | benzaldehyde | 3-amino-4-hydroxy-1,5-benzenedisulfonic acid | Cu | 598 |
| 20 | 5-acetamido-2-aminobenzoic acid | benzaldehyde | 3-amino-4-hydroxybenzenesulfonic acid | Cu | |

TABLE 1-continued

| Ex. | 2-aminobenzoic acid component | Aldehyde | 2-aminophenol component | Me | $\lambda_{max}$ [nm] ($H_2O$) |
|---|---|---|---|---|---|
| 21 | 5-acetamido-2-aminobenzoic acid (CH$_3$CONH–, CO$_2$H, NH$_2$) | 2-formylbenzenesulfonic acid (CHO, SO$_3$H) | 2-amino-4-sulfo-phenol (HO, H$_2$N, SO$_3$H) | Cu | 594 |
| 22 | 5-acetamido-2-aminobenzoic acid | 2-formylbenzenesulfonic acid | 2-amino-phenol-3,5-disulfonic acid (SO$_3$H, HO, H$_2$N, SO$_3$H) | Cu | |
| 23 | 4-acetamido-2-aminobenzoic acid (CH$_3$CONH–, CO$_2$H, NH$_2$) | 2-formylbenzenesulfonic acid | 2-amino-phenol-3,5-disulfonic acid | Cu | |
| 24 | 4-acetamido-2-aminobenzoic acid | 2-formylbenzenesulfonic acid | 2-amino-4-sulfo-phenol | Cu | |
| 25 | 4-acetamido-2-aminobenzoic acid | 2-formylbenzenesulfonic acid | 2-amino-4-ethylsulfonyl-phenol (HO, H$_2$N, SO$_2$C$_2$H$_5$) | Cu | |
| 26 | 4-acetamido-2-aminobenzoic acid | 2-formylbenzenesulfonic acid | 2-amino-4-sulfamoyl-phenol (HO, H$_2$N, SO$_2$NH$_2$) | Cu | |
| 27 | 4-acetamido-2-aminobenzoic acid | 2-formylbenzenesulfonic acid | 2-amino-6-chloro-4-sulfo-phenol (Cl, HO, NH$_2$, SO$_2$H) | Cu | |
| 28 | 4-acetamido-2-aminobenzoic acid | benzaldehyde (CHO) | 2-amino-6-chloro-4-sulfo-phenol | Cu | |
| 29 | 4-acetamido-5-methoxy-2-aminobenzoic acid (MeO, CO$_2$H, CH$_3$CONH–, NH$_2$) | benzaldehyde | 2-amino-4-sulfo-phenol | Cu | |
| 30 | 4-acetamido-5-methoxy-2-aminobenzoic acid | 2-formylbenzenesulfonic acid | 2-amino-4-sulfo-phenol | Cu | |
| 31 | 4-acetamido-5-methoxy-2-aminobenzoic acid | 2-formylbenzenesulfonic acid | 2-amino-phenol-3,5-disulfonic acid | Cu | |

TABLE 1-continued
| Ex. | 2-aminobenzoic acid component | Aldehyde | 2-aminophenol component | Me | $\lambda_{max}$ [nm] ($H_2O$) |
|---|---|---|---|---|---|
| 32 | 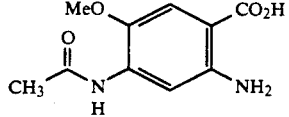 | 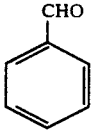 | 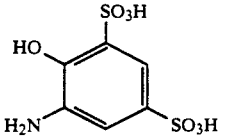 | Cu | |
| 33 | 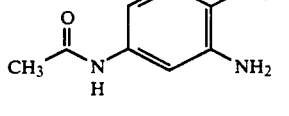 | 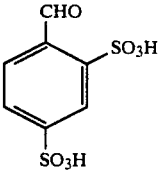 | 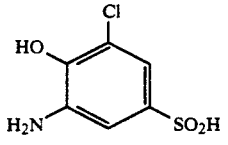 | Cu | |
| 34 | 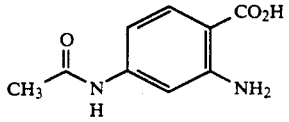 | 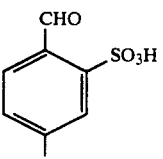 | 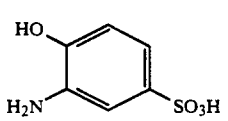 | Cu | |
| 35 | 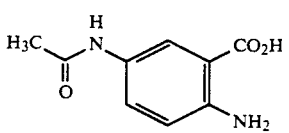 | 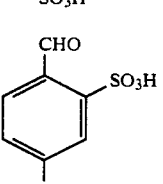 | 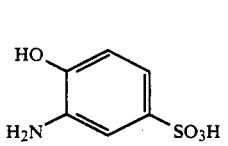 | Cu | |
| 36 | 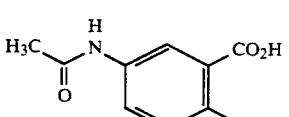 | 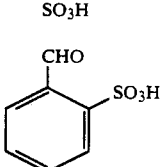 | 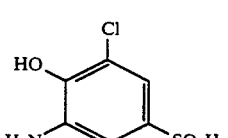 | Cu | |
| 37 | 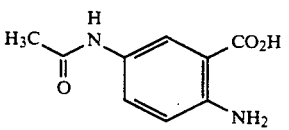 | 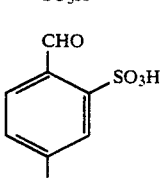 | 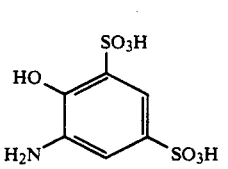 | Cu | |
| 38 | 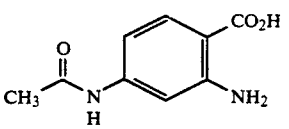 | 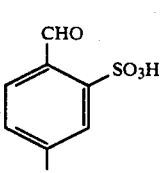 | 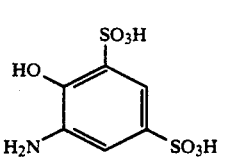 | Cu | |
| 39 | 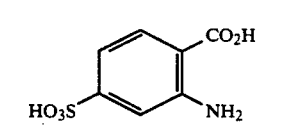 | 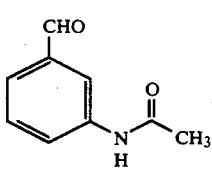 | 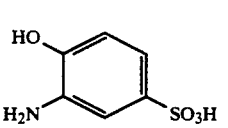 | Cu | |
| 40 | 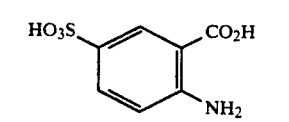 | 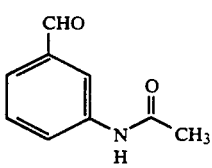 | 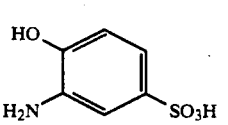 | Cu | |

TABLE 1-continued

| Ex. | 2-aminobenzoic acid component | Aldehyde | 2-aminophenol component | Me | $\lambda_{max}$ [nm] (H$_2$O) |
|---|---|---|---|---|---|
| 41 | 2-amino-5-sulfobenzoic acid (HO$_3$S at 5, CO$_2$H, NH$_2$) | 3-acetamidobenzaldehyde | 2-hydroxy-3-amino-1,5-benzenedisulfonic acid | Cu | |
| 42 | 2-amino-4-sulfobenzoic acid | 3-acetamidobenzaldehyde | 2-hydroxy-3-amino-1,5-benzenedisulfonic acid | Cu | |
| 43 | anthranilic acid | 3-acetamidobenzaldehyde | 2-hydroxy-3-amino-1,5-benzenedisulfonic acid | Cu | |
| 44 | anthranilic acid | 3-acetamidobenzaldehyde | 2-amino-4-sulfophenol | Cu | |
| 45 | anthranilic acid | 4-acetamidobenzaldehyde | 2-amino-4-sulfophenol | Cu | |
| 46 | anthranilic acid | 4-acetamidobenzaldehyde | 2-hydroxy-3-amino-1,5-benzenedisulfonic acid | Cu | |
| 47 | 2-amino-4-sulfobenzoic acid | 4-sulfobenzaldehyde | 2-hydroxy-3-amino-5-methyl-(acetamidomethyl)phenol | Cu | |
| 48 | 2-amino-4-sulfobenzoic acid | 3-sulfobenzaldehyde | 2-hydroxy-3-amino-5-methyl-(acetamidomethyl)phenol | Cu | |

TABLE 1-continued

| Ex. | 2-aminobenzoic acid component | Aldehyde | 2-aminophenol component | Me | $\lambda_{max}$ [nm] ($H_2O$) |
|---|---|---|---|---|---|
| 49 | 4-HO₃S, 2-NH₂ benzoic acid | 2-SO₃H benzaldehyde | 1-CH₂NHCOCH₃, 2-OH, 3-NH₂, 5-CH₃ benzene | Cu | |
| 50 | 2-NH₂ benzoic acid | 2,4-di-SO₃H benzaldehyde | 1-CH₂NHCOCH₃, 2-OH, 3-NH₂, 5-CH₃ benzene | Cu | |
| 51 | 5-HO₃S, 2-NH₂ benzoic acid | 2,4-di-SO₃H benzaldehyde | 1-CH₂NHCOCH₃, 2-OH, 3-NH₂, 5-CH₃ benzene | Cu | |
| 52 | 4-HO₃S, 2-NH₂ benzoic acid | 3-SO₃H benzaldehyde | 1-CH₂NHCOCH₃, 2-OH, 3-NH₂, 5-CH₃ benzene | Cu | |
| 53 | 4-HO₃S, 2-NH₂ benzoic acid | 4-SO₃H benzaldehyde | 1-CH₂NHCOCH₃, 2-OH, 3-NH₂, 5-Cl benzene | Cu | |
| 54 | 4-HO₃S, 2-NH₂ benzoic acid | 4-Cl benzaldehyde | 1-CH₂NHCOCH₃, 2-OH, 3-NH₂, 5-SO₃H benzene | Cu | |

EXAMPLE 55

1 mol of the dyestuff base (tetrasodium salt) of the formula

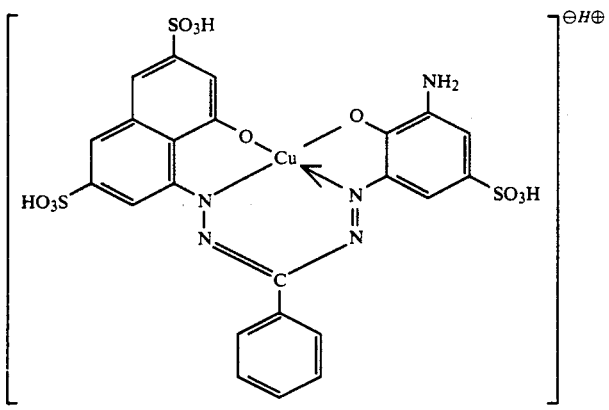

is dissolved in 1,700 ml of water and condensed at a pH of 6.5 and 40°-50° C. with 1.05 mol of 5-chloro-4,6-difluoropyrimidine.

During the condensation reaction, the pH is kept constant by means of an alkali metal bicarbonate, alkali metal carbonate or alkali metal hydroxide solution.

After about 1 hour, the reactive dyestuff formed is salted out, filtered off and dried.

A black product which, in the form of the free acid, corresponds to the following formula

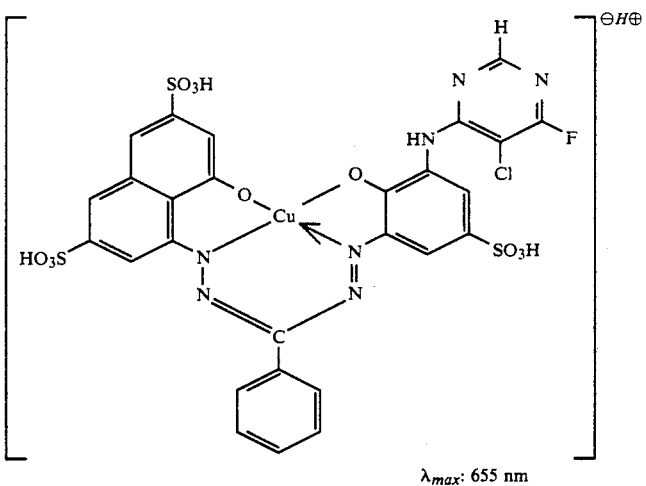

$\lambda_{max}$: 655 nm is obtained.

The dyestuff is soluble in water to give a blue-black solution and produces grey dyeings and prints on cellulose materials.

EXAMPLES 56–61

Further interesting dyestuffs are obtained by condensing the hydrazine of 8-amino-1-(phenylsulphonyloxy)naphthalene-3,6-disulphonic acid (Example 55) with the aldehydes shown in Table 2, column 2, to give hydrazones, diazotizing the 2-aminophenol components from column 3, Table 2, and carrying out the coupling reaction in the presence of a metal salt from column 4, Table 2, hydrolysing the phenylsulphonyl ester and acylamino group(s), and then condensing the product with 5-chloro- 4,6-difluoropyrimidine. The reactive dyestuffs thus obtained produce, on cellulose materials, dyeings and prints having grey to grey-green hues and the physical data given.

TABLE 2

| Ex. | 2-aminobenzoic acid component | Aldehyde | 2-aminophenol component | Me | $\lambda_{max}$ [nm] (($H_2O$)) |
|---|---|---|---|---|---|
| 56 | ![structure with SO3H, HO3S, NH2, O-SO2-phenyl on naphthalene] | CHO-phenyl | ![HO, H2N, SO3H, NHC(O)CH3 on benzene] | Cu | 655 |

TABLE 2-continued

| Ex. | 2-aminobenzoic acid component | Aldehyde | 2-aminophenol component | Me | $\lambda_{max}$ [nm] (($H_2O$)) |
|---|---|---|---|---|---|
| 57 | naphthalene with $SO_3H$, $HO_3S$, $O-SO_2$-phenyl, $NH_2$ | 4-CHO-phenyl-NH-CO-$CH_3$ | 4-OH, 3-$H_2N$, $SO_3H$ phenyl | Cu | |
| 58 | naphthalene with $SO_3H$, $HO_3S$, $O-SO_2$-phenyl, $NH_2$ | 4-CHO-phenyl-NH-CO-$CH_3$ | 3-OH, 4-$H_2N$, $SO_3H$ phenyl | Cu | |
| 59 | naphthalene with $SO_3H$, $HO_3S$, $O-SO_2$-phenyl, $NH_2$ | 3-CHO-phenyl-NH-CO-$CH_3$ | 3-OH, 4-$H_2N$, $SO_3H$ phenyl | Cu | |
| 60 | naphthalene with $SO_3H$, $HO_3S$, $O-SO_2$-phenyl, $NH_2$ | 3-CHO-phenyl-NH-CO-$CH_3$ | 2-$H_2N$-4-OH-phenyl-$SO_3H$ | Cu | |
| 61 | naphthalene with $SO_3H$, $HO_3S$, $O-SO_2$-phenyl, $NH_2$ | 3-CHO-phenyl-NH-CO-$CH_3$ | phenyl with OH, $H_2N$, NH-CO-$CH_3$, $SO_3H$ | Cu | |
| 62 | naphthalene with $SO_3H$, $HO_3S$, $O-SO_2$-phenyl, $NH_2$ | phenyl-CHO | phenyl with OH, $H_2N$, NH-CO-$CH_3$, $SO_3H$ | Cu | 656 |

EXAMPLE 63

Example 1 is repeated, except that the copper sulphate solution in Example 1 is replaced by an equivalent amount of nickel sulphate solution, to give a product which, in the form of the free acid, corresponds to the following formula

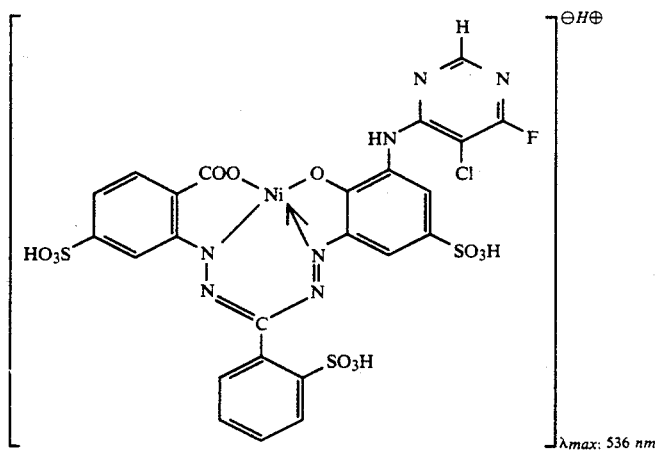

$\lambda_{max}: 536 \ nm$

The dyestuff is soluble in water to give a grey-blue solution and produces grey-blue dyeings and prints on cellulose materials.

EXAMPLE 64

Example 55 is repeated, except that the copper sulphate solution in Example 55 is replaced by an equivalent amount of nickel sulphate solution, to give a product which, in the form of the free acid, corresponds to the following formula

EXAMPLE 65

0.5 mol each of the dyestuff base (tetrasodium salt) from Example 2 and of the dyestuff base (tetra-sodium salt) from Example 3 are vigorously mixed, dissolved in 2000 ml of water and condensed at a pH of 6.7 at 40°–50° C. with 1.2 mol of 5-chloro-4,6-difluoropyrimidine.

During the condensation reaction, the pH is kept constant by means of an alkali metal bicarbonate, alkali metal carbonate or alkali metal hydroxide solution.

After the condensation with the pyrimidine derivative is complete, the mixture of dyestuffs is salted out, isolated and dried.

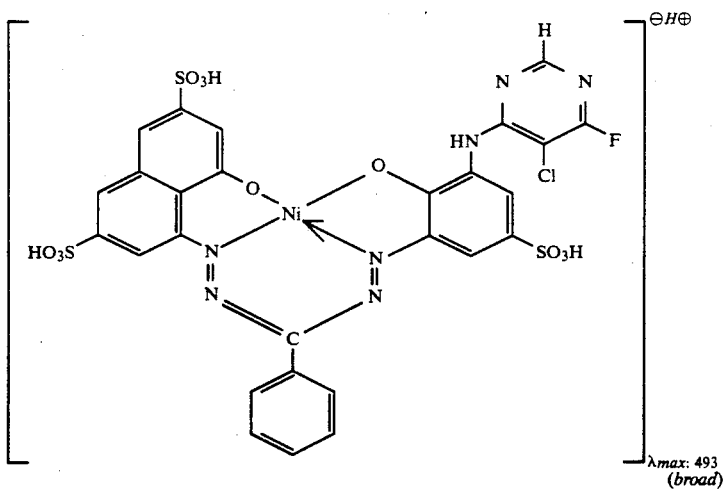

$\lambda_{max}: 493$
(broad)

The dyestuff is soluble in water to give a dark brown solution and produces brown dyeings and prints on cellulose materials.

A blue dyestuff powder which, in the form of the free acids, corresponds to a mixture of the dyestuff of the formula

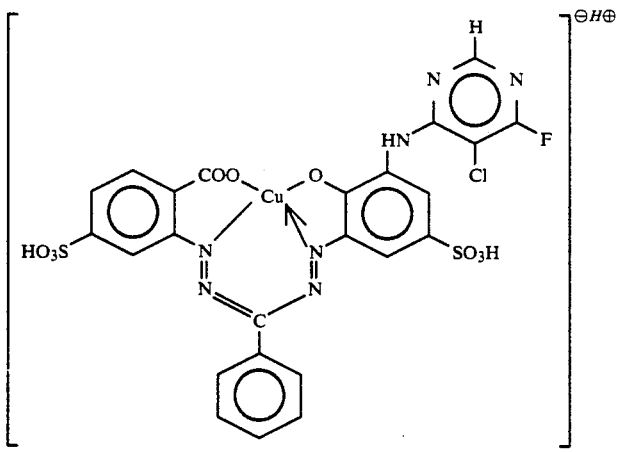

and a dyestuff of the formula

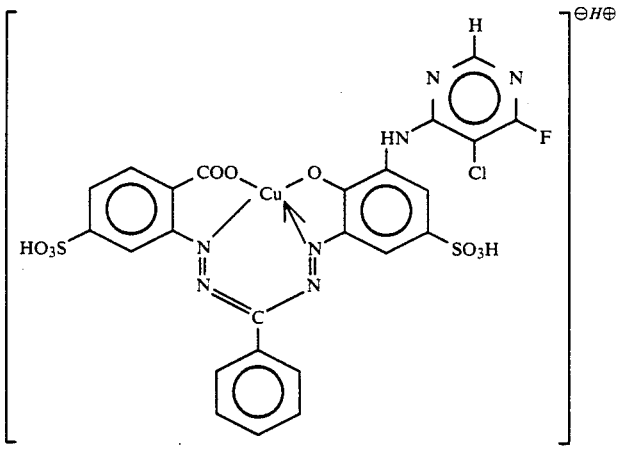

is obtained.

The mixture of dyestuffs is soluble in water to give a dark blue solution and produce blue dyeings and prints on cellulose materials.

We claim:
1. Formazan dyestuffs of the formula

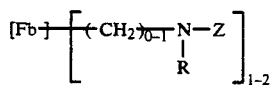

in which Fb is a radical of the formula

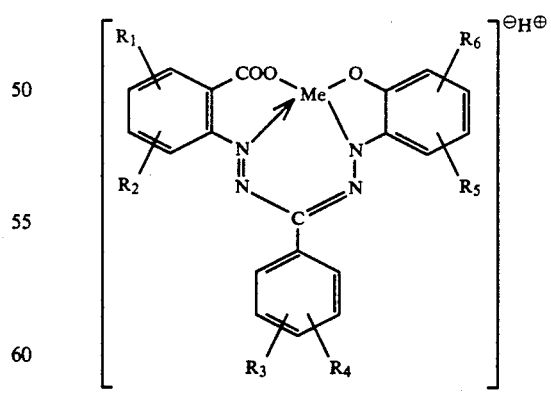

$R_1$ to $R_6$, independently of one another, are H, $C_1$-$C_4$-alkyl, $C_1$-$C_4$-alkoxy, hydroxyl, halogen, carboxyl, sulphonamido, alkyl- or arylcarbonylamino or sulphonylamino, or —$SO_3H$,
R is hydrogen, $C_1$-$C_4$-alkyl,
Z is a fibre-reactive radical of the formula

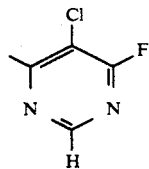
Me is a divalent metal atom.
2. Dyestuffs according to claim 1, wherein Me is a divalent metal atom selected from the group consisting of Fe, Cu, Zn, Co, and Ni.
3. Dyestuffs according to claim 2, wherein Me is Cu.
4. Dyestuffs of claim 1 of the formulae
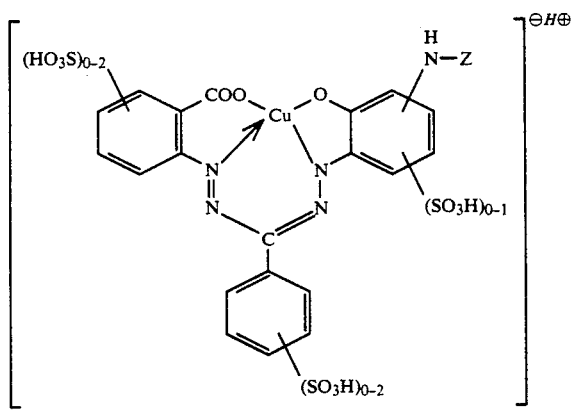
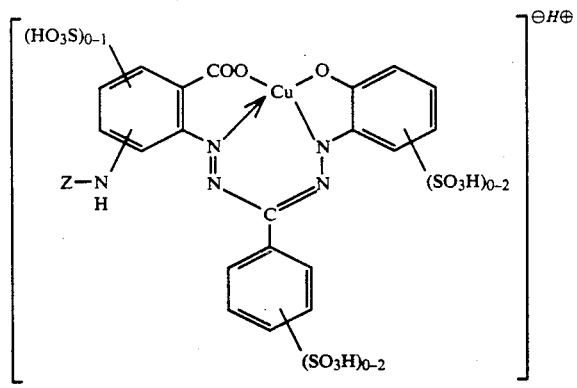
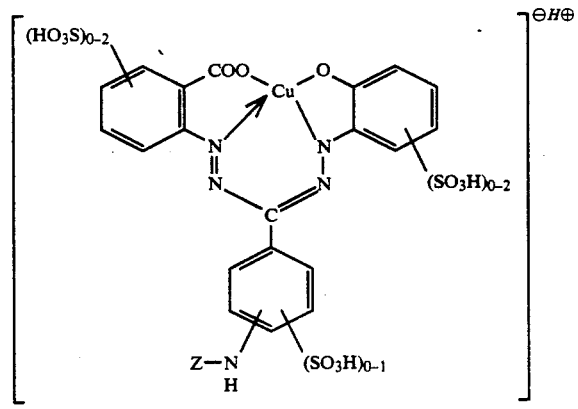

-continued
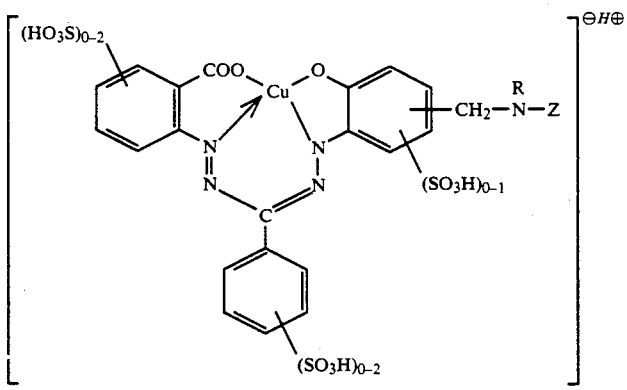
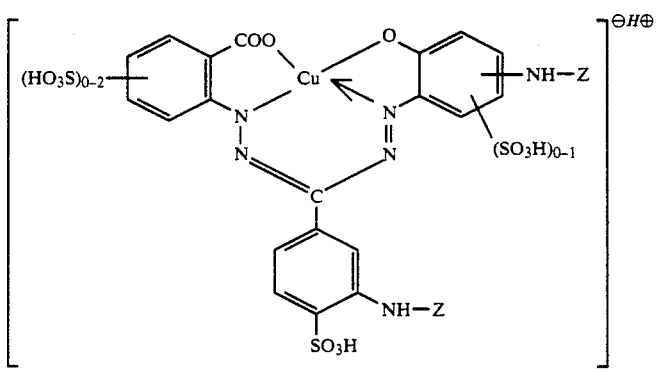
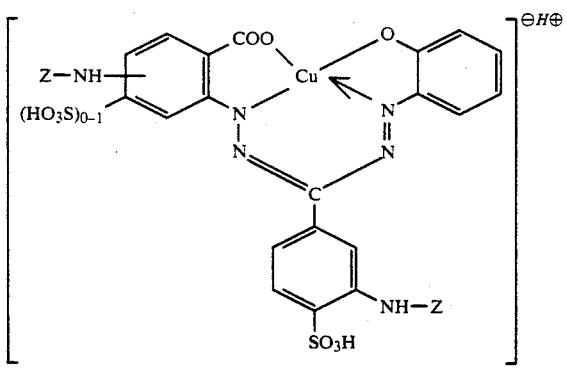
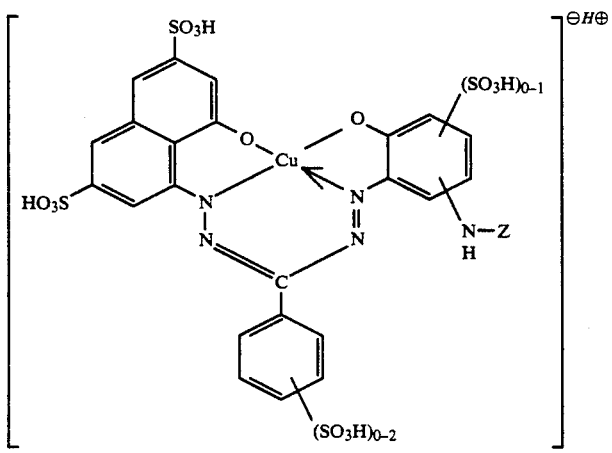

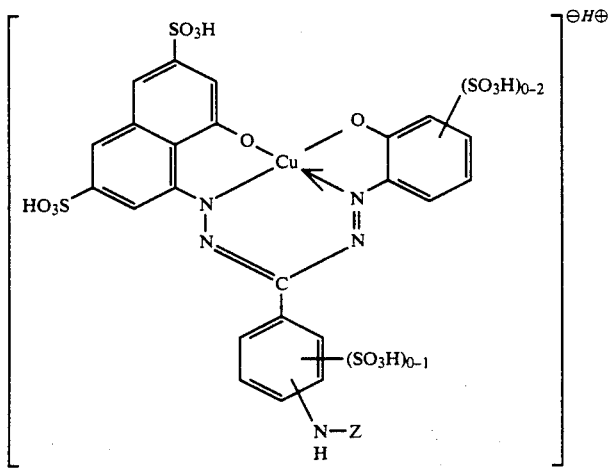
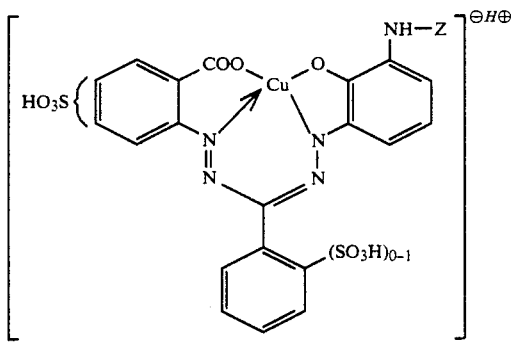
in which R and Z have the meaning given in claim 1.
5. Dyestuff according to claim 1 having the formula
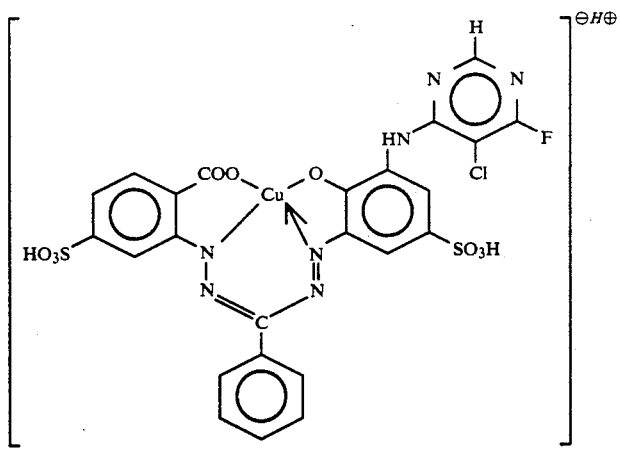
6. Dyestuff according to claim 1 having the formula

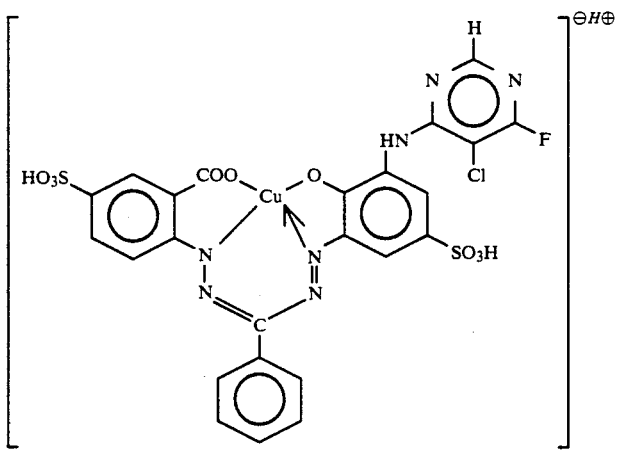
7. Dyestuff according to claim 1 having the formula
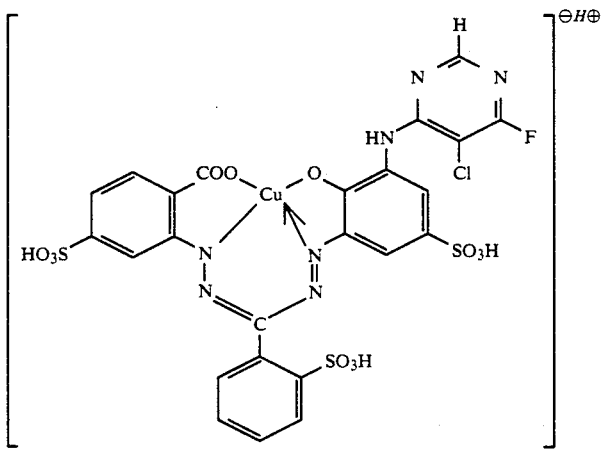
8. Dyestuff according to claim 1 having the formula
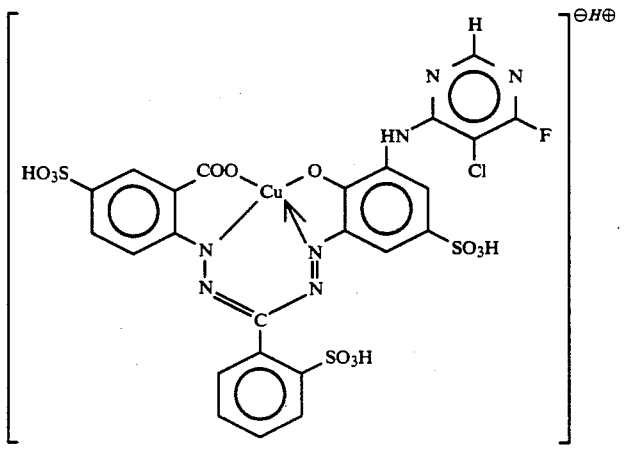
9. A mixture of dyestuffs having the formulae

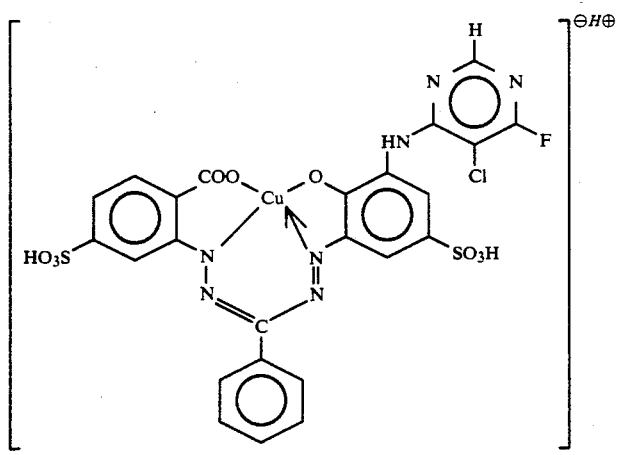
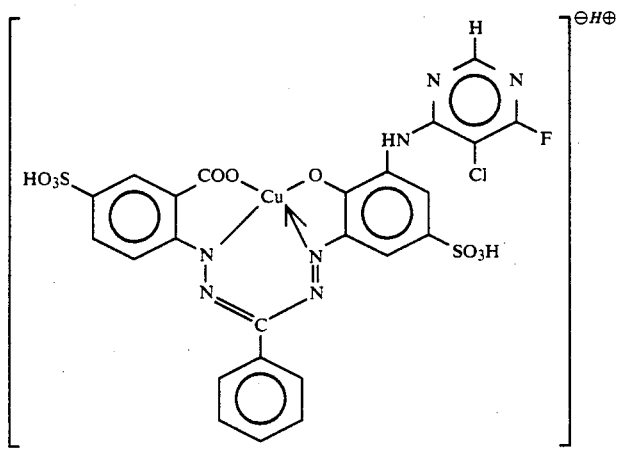
10. A method of dyeing hydroxyl- and amido-containing materials, which comprises dyeing the materials with a dyestuff according to claim 1.
11. A method of printing hydroxyl- and amido-containing materials, which comprises printing the materials with a dyestuff according to claim 1.
* * * * *